Dec. 30, 1958 W. HARTMANN 2,866,666
MACHINE FOR METERING AND DELIVERING POWDER
Filed July 24, 1957 3 Sheets-Sheet 2

INVENTOR.
WALDEMAR HARTMANN
BY
ATTORNEY

Dec. 30, 1958 W. HARTMANN 2,866,666
MACHINE FOR METERING AND DELIVERING POWDER
Filed July 24, 1957 3 Sheets-Sheet 3
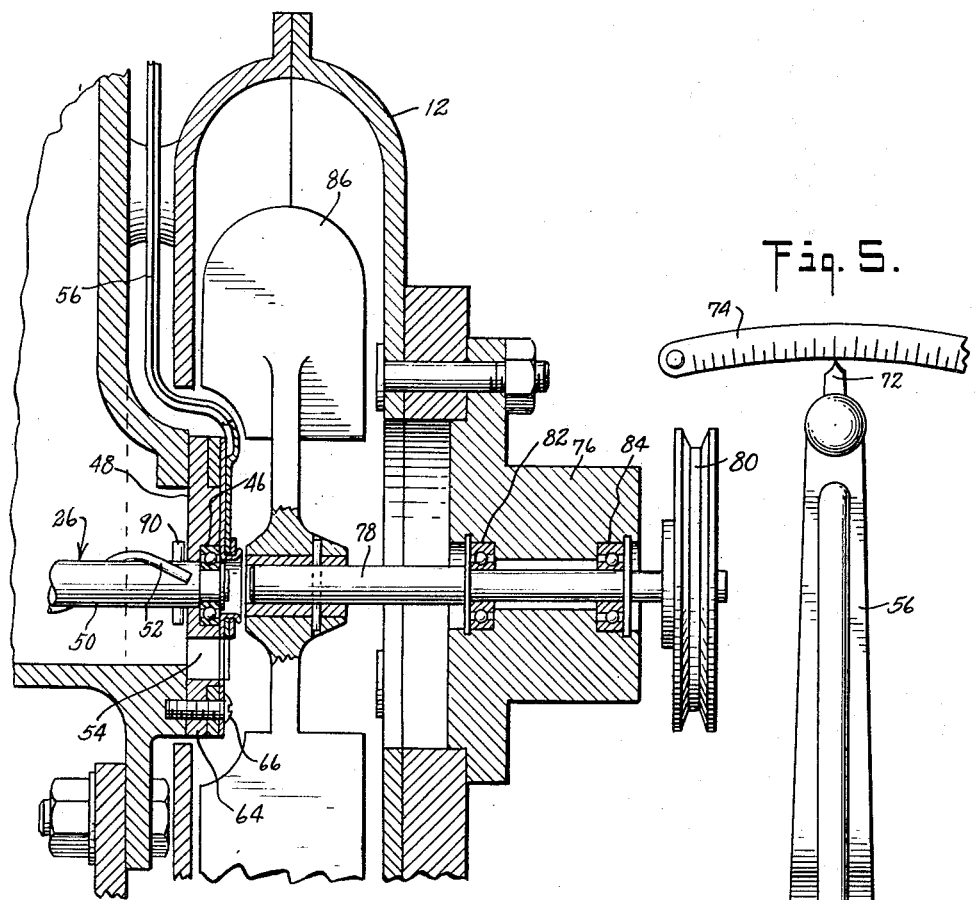
Fig. 4.
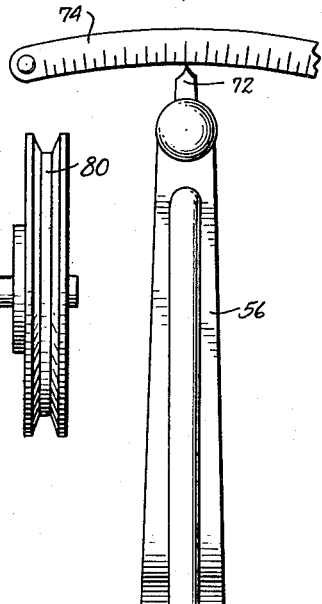
Fig. 5.
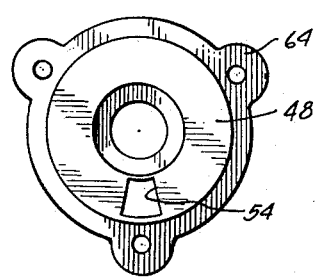
Fig. 6.
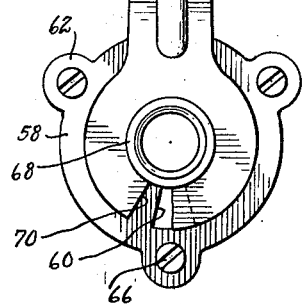
INVENTOR.
WALDEMAR HARTMANN
BY
ATTORNEY United States Patent Office 2,866,666
Patented Dec. 30, 1958

2,866,666
MACHINE FOR METERING AND DELIVERING POWDER
Waldemar Hartmann, Mountain Lakes, N. J.
Application July 24, 1957, Serial No. 673,872
3 Claims. (Cl. 302—37)

This invention relates to a device for metering and delivering powders.

It is the primary object of this invention to provide a device for continuously measuring and delivering predetermined amounts of powdered material.

It is a specific object of this invention to provide a device for measuring predetermined amounts of powdered material and continuously delivering such measured amounts in an air stream.

It is a further object of this invention to provide a device of the kind stated in which the amount of powder that is continuously delivered can be varied over wide limits, and in which the amount of powder so delivered can be controlled with a great degree of accuracy.

The device of the invention has immediate utility in the treatment of materials which require the admixture of small amounts of a treating agent in powdered form. An example of such treatment is the addition of small amounts of powdered spent sulfite liquor to agglomerated coal fines, as set forth in my United States Patent Number 2,778,718, dated January 22, 1957. The addition of measured amounts of powdered treating material to materials treated in batch presents little or no difficulty. The addition of measured amounts of powders to material with which it is to be mixed in a continuous stream is difficult to control with any degree of accuracy, however, unless relative expensive weighing and conveying equipment is employed.

The invention herein provides a powder metering and delivering device which is inexpensive, sturdy and accurate, and which, moreover, is well adapted to the delivery of selected amounts of powder to materials being treated in a continuous process. Additional uses of the device, and other advantages thereof, will become apparent as the description thereof is read in connection with the several figures of the drawings in which like reference numerals indicate like parts and in which:

Fig. 4 is a sectional view showing the principal parts of a powder metering device and related fan structure;

Fig. 5 is an enlarged detail view of a powder metering valve; and

Fig. 6 is a detail view of a metering valve component.

Figure 1:
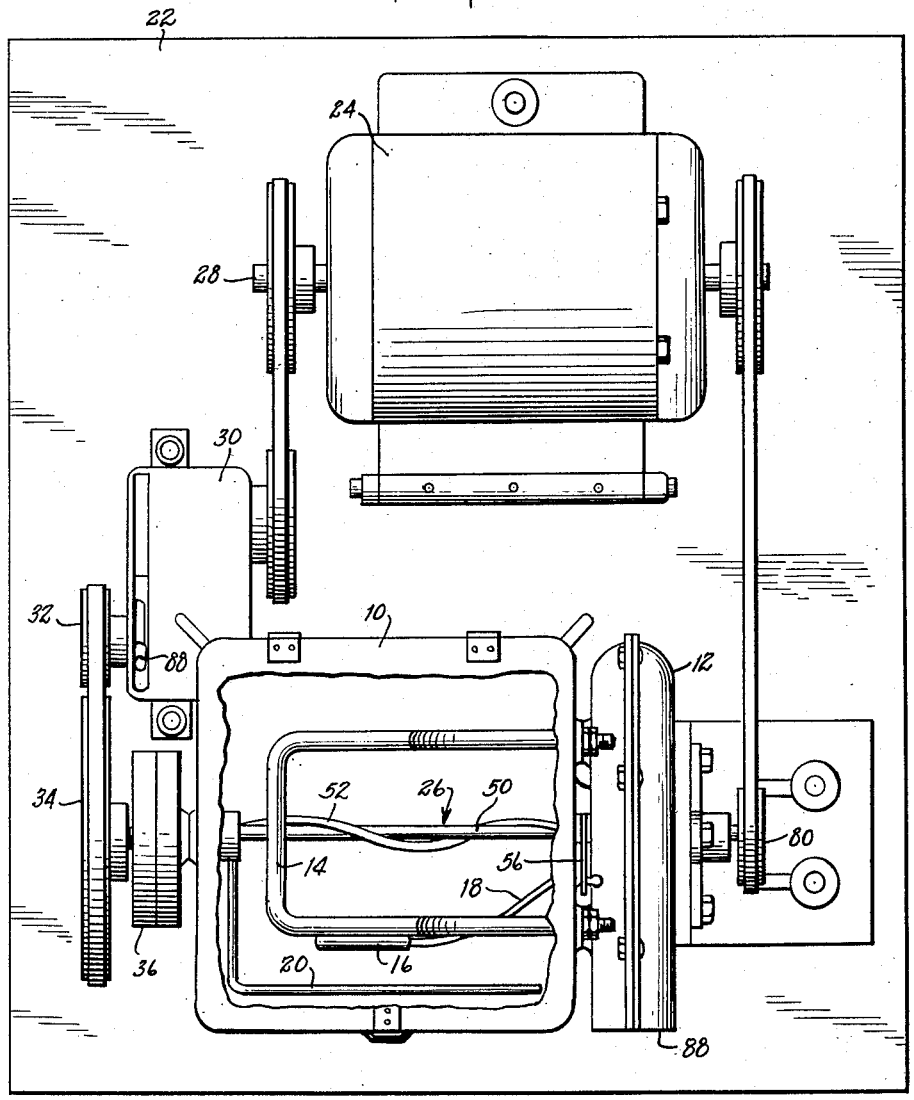
Fig. 1 is a plan view of the apparatus of the invention for metering and delivering powdered treating material, parts being broken away to show internal structure.
Figure 2:
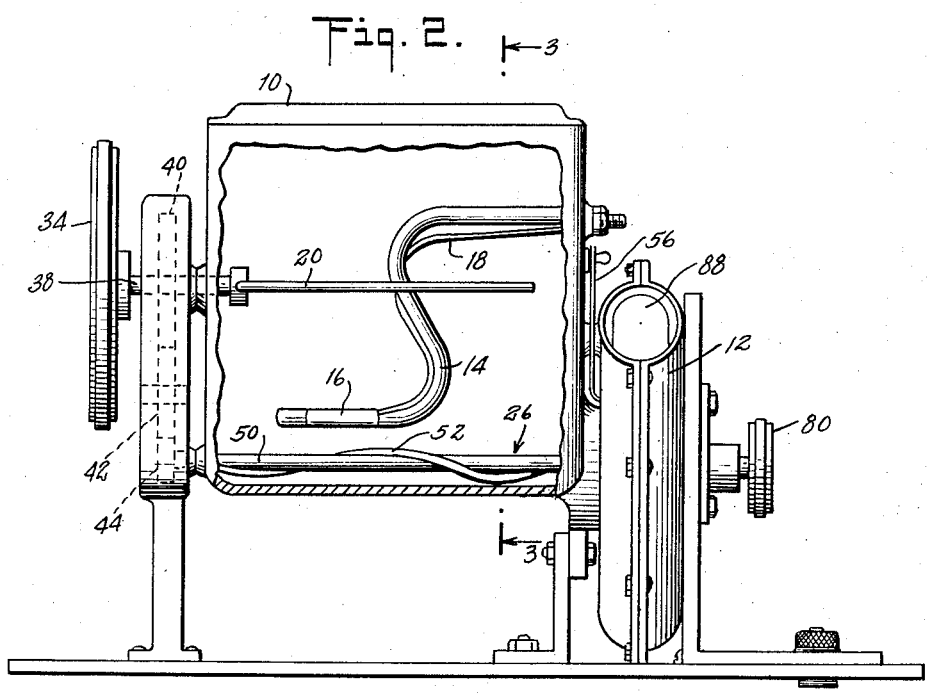
Fig. 2 is an elevational view of part of the apparatus shown in Fig. 1.
Figure 3:
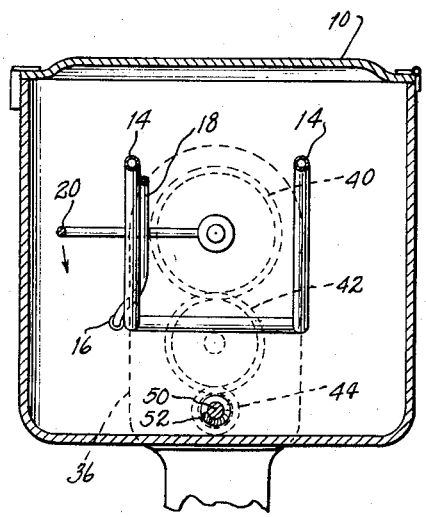
Fig. 3 is a sectional view on the line 3—3 of Fig. 2.

The powder metering and delivering mechanism disclosed in Figs. 1 through 6 is designed to provide precise control over the amount of powdered material that is delivered thereby. The treating agent in powdered form is placed into a closed hopper 10 from which it is metered into a delivery fan 12. The delivery fan 12 is adapted to discharge an air suspension of the treating powder from its outlet.

Since some powdered materials are extremely sensitive to atmospheric moisture, it is important that the same be kept dry and in flowable condition within the hopper. Accordingly, an electric heating coil 14 is located within the hopper 10 and by means of a thermostat 16 attached thereto, the coil 14 is maintained at a temperature in excess of 90° F. A control wire 18 connects the thermostat 16 to a suitable thermostatic control device at the exterior of the hopper.

To further condition the powdered treating material, it is kept in constant agitation by a beater 20 within the hopper 10.

Fig. 1 shows the dispensing unit of the invention mounted on a base plate 22 and shows that the unit comprises not only the hopper 10 and the delivery fan 12, but also an electric motor 24 which is utilized to rotate the beater 20 and a powder delivery worm 26 in the hopper, and also the delivery fan 12. Power is transmitted from one end of the motor shaft 28 to a speed reducing unit 30. Power from the output shaft 32 of the speed reducing unit 30 is transmitted to a drive wheel 34 of a transmission gear unit 36 associated with the hopper 10. The drive wheel 34 is attached to a drive shaft 38 (Fig. 2) which extends through the transmission gear unit 36 to provide driving power for the beater 20. Within the transmission gear unit 36, the drive shaft 38 has affixed thereto a gear 40 (Fig. 2) which gear is in contact with an idler gear 42 on the end of the powder delivery worm 26.

The powder delivery worm 26 extends across the bottom of the hopper 10, its remote end being mounted in anti-friction bearings 46 (Fig. 4) supported in a metering valve plate 48 which is fixed to the hopper housing. The delivery worm 26 comprises a shaft 50 which has a wire 52 helically wound thereabout and attached thereto. The shaft 50 has a pin 90 extending radially therefrom at a point in front of the bearing 46. The pin 90 sweeps the entrance to the bearing 46 and prevents an accumulation of powder which otherwise might be pressed into or otherwise find its way into the bearing as the shaft 50 is rotated. The metering valve plate 48 has a discharge aperture 54 formed therein at a point immediately below the shaft bearing 46 such that the helix 52 delivers powdered treating material to the discharge aperture 54.

The effective size of the discharge aperture 54 can be regulated by a manual control lever 56. The control lever is shown in Fig. 5 as comprising a base 58 which is the same size and shape as the plate 48. The base 58 has a discharge aperture 60 corresponding in size and location to the discharge aperture 54 of the plate 48. Attaching lugs 62 of the base 58 correspond to similar attaching lugs 64 of the plate 48 such that the two can be attached to the hopper housing by means of common screws 66. The base 58 has a centrally located upstanding flange 68 on which the control lever 56 is mounted; the flange 68 being peened over to retain the lever 56 in operative relationship with the base 58. The control lever 56 has a notch 70 which corresponds in size and shape to the discharge apertures 54 and 60 of the plate 48 and the base 58, respectively. It can be seen, therefore, that rotation of the lever 56 about the bearing flange 68 will result in either closing or opening of the discharge apertures formed through the metering valve plate 48 and the base 58. At its free end, the lever 56 has a pointer 72 which cooperates with a scale 74 such that the size of the opening between the hopper 10 and the delivery fan 12 is visually indicated.

The casing of the fan 12 is suitably attached to the outer face of the hopper 10 and provides a bearing block 76 for an impeller shaft 78 which is driven by a drive wheel 80 and a belt connection to the opposite end of the motor shaft 28. The bearing block 76 has a pair of axially spaced anti-friction bearings 82 and 84 which support the impeller shaft 78. The free end of the impeller shaft 78, which extends into the casing of the delivery fan 12, has an impeller 86 fixed thereto. As a consequence of this arrangement, powdered treating material can be metered from the hopper 10 into the delivery fan 12 and discharged from the fan outlet 88 (Fig. 1) into the material under treatment.

The amount of powdered treating material that is to be delivered at the delivery fan outlet must be capable of selective control as to its weight to accommodate the feed of powder to the material under treatment, or to the demands of other controlling considerations. The rate at which the treating material is metered into the delivery fan is determined not only by the size of the metering aperture, but also by the rate at which the shaft 26 within the hopper 10 is rotated, both the metering opening and the speed of shaft rotation being adjustable. The speed reducing unit 30 is of conventional structure and has a control lever 88 by which six speed changes can be obtained. In the instant apparatus, the motor shaft 28 rotates at 1750 R. P. M. This speed can be reduced in the speed reducing unit 120 to 30, 68, 112, 117, 240 or 353 R. P. M., depending on the position of the control lever 88. The gear ratios within the transmission gear unit 36 are such that these outputs of the speed reducing unit 30 transmit to the shaft 26, 220, 500, 828, 1265, 1753 and 2647 R. P. M., respectively. It is, therefore, possible to correlate the size of the metering opening and the speed of the delivery shaft 26 such that the treating powder is delivered to the delivery fan at a predetermined rate. For example, the powdered spent sulfite liquor identified by the trade name Marabond, in my aforesaid patent, can be delivered from the hopper at a selected rate within the range of ¼ oz. to 1½ ozs. per minute when the delivery shaft 26 is driven at 220 R. P. M., the selected rate depending, of course, on the setting of the control lever 56; within a range of ¼ oz. to 1¾ ozs. when the delivery shaft is driven at 500 R. P. M.; within a range of ¼ oz. to 2¼ ozs. when the delivery shaft is driven at 828 R. P. M.; within a range of ¼ oz. to 2½ ozs. when the delivery shaft is driven at 1265 R. P. M.; within a range of ¼ oz. to 5 ozs. when the delivery shaft is driven at 1753 R. P. M.; and within a range of ¼ oz. to 11 ozs. when the delivery shaft is driven at 2647 R. P. M. The rate of feed at any delivery shaft speed is, of course, varied by changing the metering opening through rotation of the lever 56. The rate of feed of all of the treating powders at any delivery shaft speed and for any selected size of metering opening is so constant that tables can be compiled to show the rate of feed produced at any selected delivery shaft speed and metering opening.

In a typical illustrative installation, the metering opening 54 has a base that measures ⅜", an apex that measures ¼", and side walls that measure 5⁄16". The delivery shaft 50 is 5⁄16" in diameter, and the helical wire 52, arranged about the shaft 50 at a pitch of about 1⁄7th turn per inch, is 3⁄32" in diameter. The installation referred to has been used to meter and deliver, among other powders, a powdered spent sulfite liquor sold by Lake States Yeast Corporation under its trade name "Toranil B."

The characteristics of Toranil B are as follows:

| | |
|---|---|
| Free flowing light tan powder—apparent bulking value [1] (#1/ft.$^3$): | |
| Loose | 25–29. |
| Tamped | 35–39. |
| Equilibrium moisture [2] | 7.7. |
| pH (50% water solution) | 4.6 to 4.7. |
| Surface tension (dynes/cm.) (10% water solution) | 48. |
| Charring temp.: | |
| In air (30 min.) | 475° C. |
| (approx. 1 min.) | 600° C. |
| In nitrogen (30 min.) | 500° C. |
| (approx. 1 min.) | 630° C. |

[1] Modification of ASTM C29–42.
[2] Percent increase in weight when oven dry material is exposed at 70° F. and 50% R. H.

In metering Toranil B, the metering valve of the installation referred to was set to various positions while the delivery shaft 26 was rotated at various speeds, and it was found over a series of tests that the amount of powder delivered remained the same at any given valve opening and any selected shaft speed, all as indicated in the following tabulation in which #2 represents a delivery valve restriction to 3⁄32" at its base and 1⁄16" at its apex; #4 represents a delivery valve restriction to 5⁄32" at its base and ⅛" at its apex; #6 represents a delivery valve restriction to 7⁄32" at its base and 3⁄16" at its apex; #8 represents a delivery valve restriction to 9⁄32" at its base and ¼" at its apex; and #10 represents a delivery valve restriction to 11⁄32" at its base and ¼" at its apex.

| Delivery Shaft Speed | Material Delivery to Fan per minute, per metering opening | | | | |
|---|---|---|---|---|---|
| | #2 | #4 | #6 | #8 | #10 |
| | Oz. | Oz. | Oz. | Oz. | Oz. |
| 500 R. P. M | ¼ | ½ | 1¼ | 2 | 2¾ |
| 828 R. P. M | ¼ | 1¼ | 2¾ | 4¼ | 5¼ |
| 1,265 R. P. M | ¼ | 1½ | 3¼ | 5¾ | 6½ |
| 1,753 R. P. M | ¼ | 2 | 4½ | 7¼ | 10 |

It will be noted, particularly by reference to Fig. 4, that the powder delivery shaft 26, while driven from the same motor, is quite independent of the impeller shaft 78. This is an important consideration in the successful operation of the device herein for the reason that it permits the selective metering of the powder into the delivery fan 12 without reference to the rate at which the impeller shaft 78 is rotated. In other words, the impeller shaft 78 is adapted to be rotated at a constant speed, while the delivery shaft 26 is designed for operation at variable speeds. Thus, no matter what amount of powder is delivered into the delivery fan 12 by regulating the metering throat 54, the powder so delivered will be transported in the air stream from the fan at a constant speed.

In the above description, an illustrative embodiment has been set forth by way of explanation. It will be understood that modifications of the specific mechanisms and their relative proportions may be made in accordance with the spirit of the invention set forth herein. Accordingly, it is intended that this invention be limited only by the scope of the appended claims.

I claim:

1. In a device for metering closely controlled small quantities of finely powdered material, a receptacle adapted to hold a supply of powdered material, a fan casing fixed to one side of said receptacle, a rotatable powder delivery device including a shaft mounted near the bottom of said receptacle, an impeller shaft mounted for rotation in said fan casing in axial alignment with said shaft of said powder delivery device, an impeller having a plurality of radial blades mounted on said impeller shaft, a powder metering passage interconnecting said receptacle and said fan casing at a point adjacent said shafts whereby powder discharged therethrough is delivered to the axial region of said impeller, externally accessible and manually adjustable means for selectively restricting said metering passage, means for driving said impeller, and variable speed means for driving said powder delivery device.

2. The device of claim 1 in which said manually adjustable means for restricting said metering passage comprises a hand lever extending along a wall of said receptacle and being adapted for movement to any one of a plurality of selective positions to selectively vary the size of said metering passage.

3. The device of claim 1 in which said receptacle has mounted therein a rotatable beater and in which said rotatable beater is rotated through a speed reduction gear by said means for driving said rotatable powder delivery device.

References Cited in the file of this patent

UNITED STATES PATENTS

| | | |
|---|---|---|
| 1,495,479 | Grindle | May 27, 1924 |
| 1,781,509 | Gurney | Nov. 11, 1930 |
| 1,837,635 | Van Deventer | Dec. 22, 1931 |